(12) United States Patent
Lepinski et al.

(10) Patent No.: US 11,033,765 B2
(45) Date of Patent: Jun. 15, 2021

(54) FRYER FIRE SUPPRESSION SYSTEM

(71) Applicant: Tyco Fire Products LP, Lansdale, PA (US)

(72) Inventors: Joshua Lepinski, Coleman, WI (US); Nicholas David Lukowski, Menominee, MI (US)

(73) Assignee: Tyco Fire Products LP, Lansdale, PA (US)

( * ) Notice: Subject to any disclaimer, the term of this patent is extended or adjusted under 35 U.S.C. 154(b) by 75 days.

(21) Appl. No.: 16/222,110

(22) Filed: Dec. 17, 2018

(65) Prior Publication Data
US 2020/0188712 A1  Jun. 18, 2020

(51) Int. Cl.
*A62C 3/00* (2006.01)
*A47J 37/12* (2006.01)

(52) U.S. Cl.
CPC .......... *A62C 3/006* (2013.01); *A47J 37/1266* (2013.01); *A47J 37/1271* (2013.01)

(58) Field of Classification Search
CPC ....... A62C 3/006; A47J 37/12; A47J 37/1204; A47J 37/1209; A47J 37/1257; A47J 37/1266; A47J 37/1271; A47J 37/1276; A47J 37/128
USPC .......................................................... 169/65
See application file for complete search history.

(56) References Cited

U.S. PATENT DOCUMENTS

| | | | | |
|---|---|---|---|---|
| 3,463,233 A | * | 8/1969 | Haessler | A62C 3/006 169/47 |
| 3,584,688 A | * | 6/1971 | Duncan | A62C 3/006 169/47 |
| 3,981,232 A | * | 9/1976 | Williamson | A47J 36/38 99/337 |
| 4,489,647 A | * | 12/1984 | Stamps | A47J 37/1228 169/65 |
| 4,505,194 A | * | 3/1985 | Bishop | A47J 37/1228 454/49 |

(Continued)

FOREIGN PATENT DOCUMENTS

WO   WO-2014/145943   9/2014

OTHER PUBLICATIONS

International Search Report and Written Opinion for International Application No. PCT/IB2019/060864, dated Mar. 18, 2020, 10 pages.

*Primary Examiner* — Darren W Gorman
(74) *Attorney, Agent, or Firm* — Foley & Lardner LLP

(57) ABSTRACT

A cooking system includes an appliance configured to cook food products, a fire suppressant supply configured to selectively provide fire suppressant agent, and a conduit. The appliance includes a food receptacle and a cover selectively repositionable between a fully open position and a closed position. The cover defines an internal volume configured to contain the food products during cooking, a fluid aperture fluidly coupled to the internal volume, and an access aperture through which the food products may be introduced into the internal volume. The cover extends at least partway across the access aperture in the closed position. The conduit fluidly couples the fire suppressant supply to the fluid aperture. The fire suppressant supply and the conduit are configured to introduce the fire suppressant agent into the internal volume of the food receptacle at least when the cover is in the closed position.

15 Claims, 5 Drawing Sheets

(56) References Cited

U.S. PATENT DOCUMENTS

| | | | |
|---|---|---|---|
| 5,129,386 A | 7/1992 | Meister | |
| 5,249,510 A | 10/1993 | Rozak et al. | |
| 6,186,241 B1 * | 2/2001 | Murr | A62C 3/06 |
| | | | 169/60 |
| 6,810,791 B2 * | 11/2004 | Kijimoto | A47J 27/0817 |
| | | | 126/374.1 |
| 7,681,655 B2 | 3/2010 | Biehl | |
| 2008/0250939 A1 * | 10/2008 | See | A47J 37/1271 |
| | | | 99/403 |

* cited by examiner

FRYER FIRE SUPPRESSION SYSTEM

BACKGROUND

The present disclosure relates generally to fire suppression systems. More specifically, the present disclosure relates to fire suppression systems for use with fryers.

Frying is a cooking technique that uses heated cooking oil to prepare food such as chicken and fish. Some fryers perform frying at atmospheric pressure. Other fryers, known as pressure fryers, fry food products within a fry pot at an elevated pressure (e.g., above atmospheric pressure). Frying under pressure permits the use of lower cooking temperatures for longer oil life and faster cooking times. Frying under pressure also retains more moisture within the food and reduces the amount of oil absorbed into the food. To maintain the pressure within the fry pot, some pressure fryers include a lid that is used to selectively seal the volume of the fry pot.

SUMMARY

At least one embodiment relates to a cooking system including an appliance configured to cook food products, a fire suppressant supply configured to selectively provide fire suppressant agent, and a conduit. The appliance includes a food receptacle and a cover selectively repositionable between a fully open position and a closed position. The cover defines an internal volume configured to contain the food products during cooking, a fluid aperture fluidly coupled to the internal volume, and an access aperture through which the food products may be introduced into the internal volume. The cover extends at least partway across the access aperture in the closed position. The conduit fluidly couples the fire suppressant supply to the fluid aperture. The fire suppressant supply and the conduit are configured to introduce the fire suppressant agent into the internal volume of the food receptacle at least when the cover is in the closed position.

Another embodiment relates to a fire suppression system for suppressing fires within an internal volume of an appliance where the appliance defines a fluid aperture fluidly coupled to the internal volume. The fire suppression system includes a fire suppressant supply configured to selectively provide fire suppressant agent, a control system configured to activate the fire suppressant supply to provide the fire suppressant agent in response to an indication that a fire has been detected, a conduit fluidly coupling the fire suppressant supply to the fluid aperture, and a flow prevention device positioned along the conduit and configured to selectively fluidly decouple the fire suppressant supply from the internal volume of the appliance. The fire suppressant supply and the conduit are configured to introduce the fire suppressant agent into the internal volume of the appliance through the fluid aperture.

Another embodiment relates to a method of suppressing a fire including providing an appliance, providing a fire suppressant supply configured to selectively supply fire suppressant agent, fluidly coupling the fire suppressant supply to an internal volume of the appliance through a conduit, and activating the fire suppressant supply in response to detection of the fire. The appliance includes a food receptacle and a cover. The food receptacle defines the internal volume, a fluid aperture fluidly coupled to the internal volume, and an access aperture configured to facilitate introduction of food products into the internal volume. The cover is selectively repositionable between a fully open position and a closed position, and the cover extends at least partway across the access aperture in the closed position. When the fire suppressant supply is activated, the fire suppressant agent passes through the conduit and the fluid aperture and into the internal volume. The fluid aperture is positioned such that the fire suppressant agent can be supplied to the internal volume at least when the cover is in the closed position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
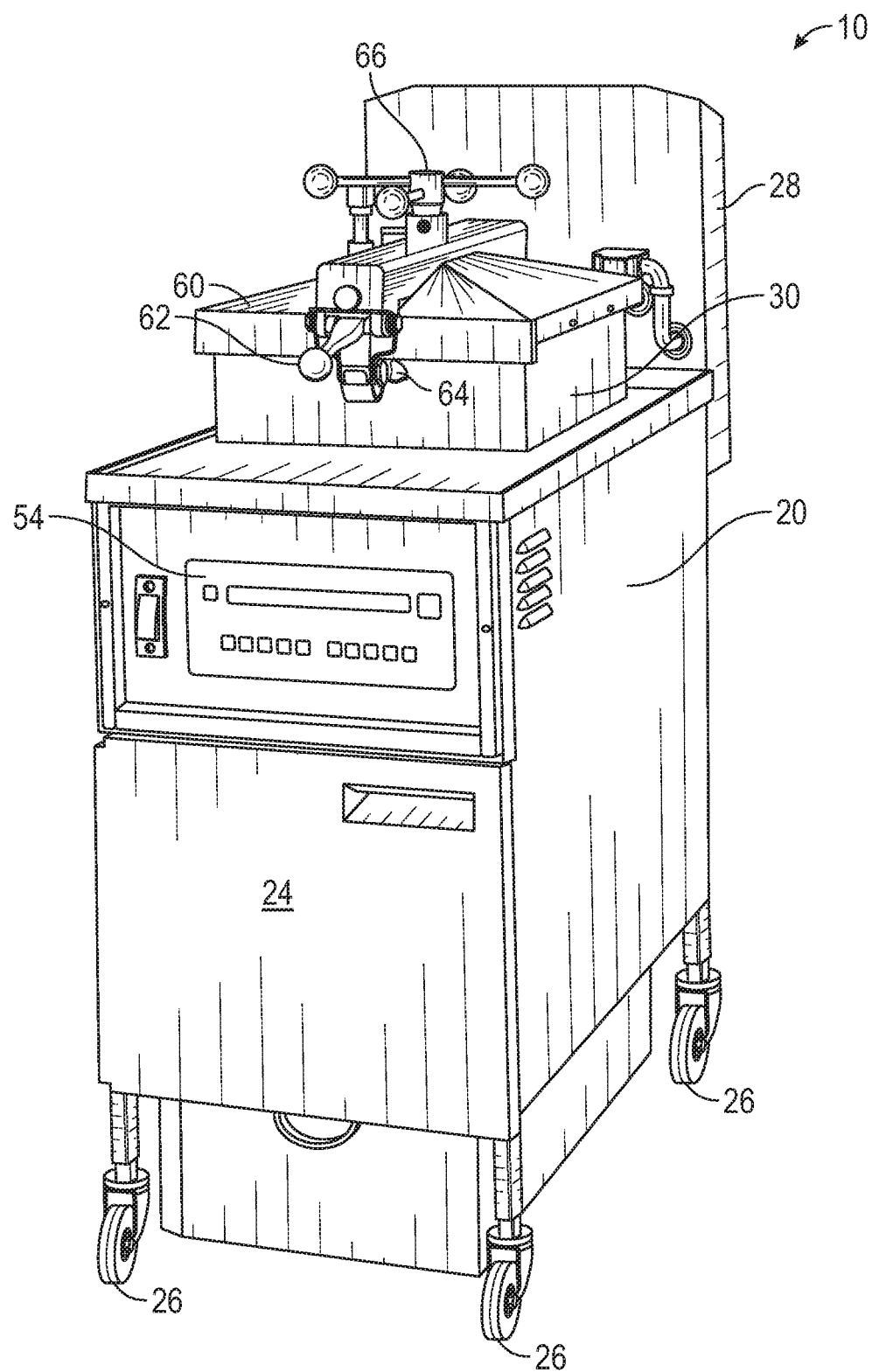
FIGS. 1 and 2 are front perspective views of a pressure fryer according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As used herein, the term "downstream" means a direction that is defined by a flow path of fire suppressant agent throughout a fire suppression system. Specifically, when the supply assembly 110 is activated, fire suppressant agent flows through the pipe 120 along a flow path from the supply assembly 110 to the fry pot volume 32. The direction of flow followed by the fire suppressant agent is the "downstream" direction. As used herein, the term "upstream" means a direction opposite the downstream direction.

Overview

Referring generally to the figures, a pressure fryer includes a fry pot that is configured to be at least partially filled with a cooking oil. A heating element within the pressure fryer heats the cooking oil. A lid coupled to the fry pot is selectively repositionable between a fully open position and a closed position. In the closed position, the lid is selectively reconfigurable between a sealed configuration and an unsealed configuration. During operation, food products are placed into the cooking oil for frying. With the lid in the sealed configuration, the pressure of gas (e.g., steam, etc.) within the fry pot increases. A pair of pressure control devices are fluidly coupled to the fry pot. The pressure control devices selectively release gas from within the fry pot to the atmosphere to maintain the pressure within the fry pot at a desired working pressure.

In some situations, fires can occur within the fry pot of a pressure fryer. Some pressure fryers include a fire suppression system that provides a fire suppressant agent to suppress such fires. These fire suppression systems include nozzles positioned outside of the fry pot that address fires when the lid is in the fully open position. However, such systems have a limited ability to address fires when the lid of the fryer is closed, as the lid obstructs the path of the agent from the external nozzles.

To address fires that occur when the lid of the pressure fryer is closed, a pressure fryer described herein utilizes a fire suppression system that introduces fire suppressant agent into the fry pot irrespective of the position of the lid. Specifically, in the event of a fire, a fire suppressant agent supply provides a volume of fire suppressant agent through a conduit. The agent passes through a nozzle that controls the volumetric flow rate of the agent. The nozzle limits the kinetic energy of the agent entering the fry pot such that the agent does not cause the cooking oil to splash and escape the fry pot. A burst disc is positioned downstream of the nozzle. The burst disc fluidly decouples the fry pot from the fire suppressant agent supply, preventing contaminants from the fry pot (e.g., cooking oil, steam, etc.) from entering the nozzle, the conduit, or the fire suppressant agent supply. The burst disc also prevents contaminants from the fire suppression system (e.g., dust, etc.) from entering the fry pot. When the pressure differential across the burst disc exceeds a threshold pressure (e.g., when pressurized agent is supplied by the fire suppressant agent supply), the burst disc ruptures, permitting the agent to flow therethrough. A check valve is positioned downstream of the burst disc. The check valve prevents pressure fluctuations within the gas of the fry pot from affecting the burst disc. However, the check valve permits the agent to flow freely therethrough (e.g., with negligible resistance). The check valve is fluidly coupled to the fry pot between the fry pot and the pressure control devices. Accordingly, when a fire is detected, the fire suppressant agent supply provides agent through the nozzle, the burst disc, and the check valve and directly into the fry pot, suppressing any fires within the fry pot.

Pressure Fryer

Figure 2:
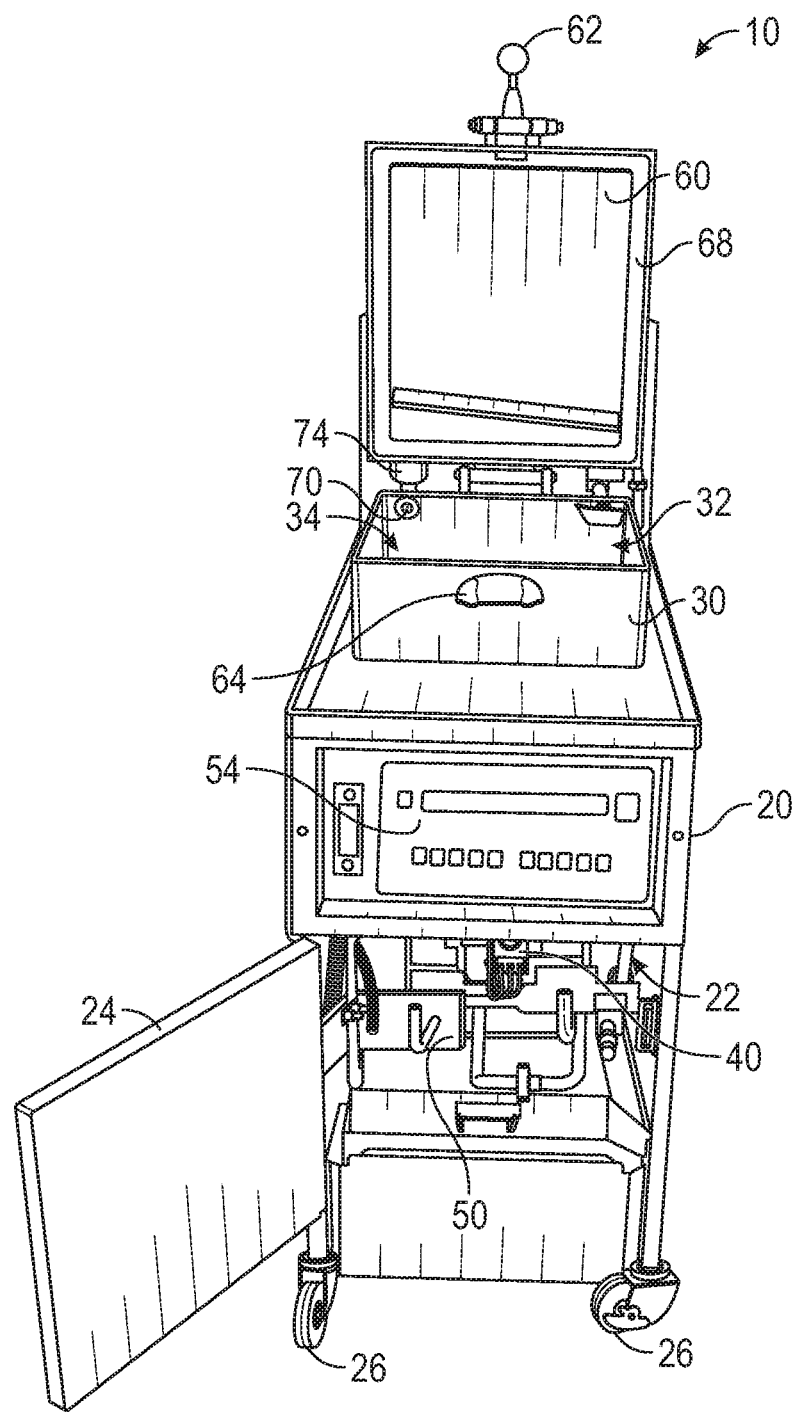

Referring to FIGS. 1 and 2, a cooking, frying, or pressure frying system or assembly includes a cooking appliance, shown as pressure fryer 10, is shown according to an exemplary embodiment. The pressure fryer 10 includes a chassis or body, shown as main body 20. The main body 20 supports the other components of the pressure fryer 10. The main body 20 defines a volume, shown as component chamber 22, that contains one or more components of the pressure fryer 10. The component chamber 22 is selectively enclosed by a door 24. The main body 20 may be configured to rest atop a flat surface (e.g., a floor, a countertop, etc.). In some embodiments, the main body 20 is configured such that the pressure fryer 10 is mobile. By way of example, in the embodiment shown in FIGS. 1 and 2, the pressure fryer 10 includes wheels, shown as casters 26, coupled to the main body 20 to facilitate movement across the flat surface. In other embodiments, the pressure fryer 10 is a fixed or immobile appliance. In some embodiments, the main body 20 is coupled to a guard, shown as backsplash 28, positioned at the rear of the pressure fryer 10. The backsplash 28 extends upward from the main body 20, preventing material (e.g., food products, cooking oil, etc.) from dropping behind the pressure fryer 10.

The pressure fryer 10 includes a food receptacle, cooking vessel, container, pot, basin, bucket, pitcher, or can, shown as fry pot 30. The fry pot 30 is coupled to the main body 20. The fry pot 30 defines an internal volume, shown as fry pot volume 32. The fry pot volume 32 is enclosed on the bottom, left, right, front, and rear sides by the fry pot 30. The fry pot volume 32 is accessible by an operator through an aperture, shown as access aperture 34, that extends along the top of the fry pot volume 32. The access aperture 34 is positioned at the top of the fry pot 30 such that liquid placed within the fry pot 30 is retained within the fry pot volume 32. As shown, the fry pot volume 32 has a substantially rectangular cross section. In other embodiments, the fry pot 30 is otherwise shaped.

The pressure fryer 10 is configured to fry one or more food products (e.g., pieces of chicken or fish, etc.). The food products are placed in a fry basket, which is then lowered into the fry pot volume 32 through the access aperture 34. The fry pot volume 32 is partially or completely filled with a cooking oil (e.g., peanut oil, canola oil, etc.) that is heated to cook the food products. The pressure fryer 10 includes a heater, shown as heating element 40, that heats the cooking oil. In some embodiments, the heating element 40 is a combustion heater that combusts a fuel (e.g., natural gas, etc.) to generate heat. In other embodiments, the heating element 40 is an electric heater that utilizes electrical energy to generate heat (e.g., through resistance). The heating element 40 may come into contact with the cooking oil, passing the heat directly into the cooking oil, or the heating element 40 may provide thermal energy to the cooking oil indirectly through another component (e.g., the wall of the fry pot 30, etc.).

The pressure fryer 10 includes a cleaning or filtration system, shown as filtration system 50. The filtration system 50 is configured to remove contaminants from the cooking oil (e.g., small pieces of food, etc.). In some embodiments, the filtration system 50 is configured to circulate the cooking oil out of the fry pot volume 32, through a filter, and back into the fry pot volume 32. The fry pot volume 32 may define one or more apertures that facilitate the transfer of cooking oil from the fry pot volume 32 into the filtration system 50. The filtration system 50 may include pumps, filters, conduits, fittings, or other components used to circulate and filter the cooking oil. In other embodiments, the filtration system 50 is omitted.

The pressure fryer 10 further includes a user interface, shown as control panel 54, that is configured to facilitate user control over the operation of the pressure fryer 10. In the embodiment shown in FIGS. 1 and 2, the control panel 54 is positioned on a front side of the main body 20. In other embodiments, the control panel 54 is positioned elsewhere. The control panel 54 may include buttons, levers, switches, knobs, screens, touch sensitive devices (e.g., touchscreens, touch pads, etc.), or other user interface devices. The control panel 54 may be operatively coupled to a controller (e.g., a microcontroller, a controller such as the controller 132, etc.). The control panel 54 may be configured to receive user inputs and cooperate with the controller to control the heating element 40 (e.g., to set a target temperature for the cooking oil, to turn off the heating element 40, etc.) and/or the filtration system 50 (e.g., to clean the cooking oil).

The pressure fryer 10 further includes a sealing assembly or cover (e.g., a hatch, a door, a lid, etc.), shown as lid 60. The lid 60 is pivotally coupled to the fry pot 30 such that the lid 60 is selectively repositionable through a range of different positions. The lid 60 may be configured to selectively extend across the access aperture 34 to seal the fry pot volume 32 relative to the surrounding atmosphere. In a fully open or raised position, shown in FIG. 2, the lid 60 is moved away from the access aperture 34 such that the access aperture 34 fluidly couples the fry pot volume 32 to the surrounding atmosphere, permitting gas (e.g., steam, etc.), liquids (e.g., cooking oil, etc.), and solids (e.g., the fry basket, the food products, etc.) to freely enter and exit the fry pot volume 32 through the access aperture 34. In a closed or lowered position shown in FIG. 1, the lid 60 rests atop the fry pot 30. The lid 60 extends across the access aperture 34, obstructing movement through the access aperture 34 (e.g., preventing food products from entering or exiting the fry pot volume 32). While in the closed position, the lid 60 is selectively reconfigurable between an unsealed configuration and a sealed configuration. In the unsealed configuration, the lid 60 may not fully seal the fry pot volume 32 such that gas can exit through the access aperture 34. In the sealed configuration, the lid 60 is sealed to the fry pot 30. The lid 60 seals the fry pot volume 32 relative to the surrounding atmosphere (e.g., at least across the access aperture 34).

The lid 60 includes a closure mechanism, shown as latch 62, that is configured to selectively limit movement of the lid 60 relative to the fry pot 30. By way of example, the latch 62 may selectively limit upward movement of the lid 60 toward the fully open position. The latch 62 is configured to selectively engage a protrusion or recess, shown as cleat 64, defined by the fry pot 30, selectively coupling the latch 62 to the fry pot 30. The latch 62 may include a lever that, when rotated, disengages the latch 62 from the cleat 64, permitting free movement of the lid 60. The latch 62 may be engaged with the cleat 64 in both the unsealed and sealed configurations. Accordingly, engagement of the latch 62 with the cleat 64 may not cause the lid 60 to seal the fry pot volume 32.

The lid 60 further includes a knob, wheel, or lever, shown as sealing knob 66, and a sealing member, shown as seal 68, that cooperate to selectively seal the lid 60 with the fry pot 30. Specifically, the sealing knob 66 can be rotated to selectively engage or disengage the seal 68 with the fry pot 30, sealing the lid 60 against the fry pot 30 across the access aperture 34. By way of example, rotating the sealing knob 66 in a first direction may cause the seal 68 to move downward and engage the fry pot 30 such that the engagement between the seal 68 and the fry pot 30 surrounds the access aperture 34. Rotating the sealing knob 66 in a second direction opposite the first direction may cause the seal 68 to move upward and disengage from the fry pot 30. When the seal 68 engages the fry pot 30, fluidly decoupling the fry pot volume 32 from the surrounding atmosphere, the lid 60 is in the sealed configuration.

To reconfigure the lid 60 from the fully open position to the sealed configuration, the lid 60 is lowered until it rests atop the fry pot 30 (i.e., in the lowered position). The latch 62 is engaged with the cleat 64, reconfiguring the lid 60 into the unsealed configuration. The sealing knob 66 is then rotated in a first direction, engaging the seal 68 with the fry pot 30 and configuring the lid 60 into the sealed configuration. To reconfigure the lid 60 from the sealed configuration to the fully open position, this process may be followed in reverse.

In an alternative embodiment, the lid 60 is otherwise coupled to the main body 20 and the fry pot 30. By way of example, the lid 60 may be slidably coupled to the main body 20 such that the lid 60 is movable vertically. The lid 60 may engage a rail that selectively holds the lid 60 in various vertical positions. In such an embodiment, the lid 60 may still be selectively repositionable between a fully open position and a closed position and selectively reconfigurable between an unsealed configuration and a sealed configuration.

During operation of the pressure fryer 10 in the sealed configuration, gas within the fry pot volume 32 builds (i.e., increases) in pressure. This increase in pressure may be caused by an increase in temperature of the gas within the fry pot volume 32, the production of steam, or by another source. Frying under pressure permits the use of lower cooking temperatures for longer cooking oil life and faster cooking times compared to a fryer operating at atmospheric pressure. Frying under pressure also retains more moisture within the food and reduces the amount of oil absorbed into the food.

Figure 5:
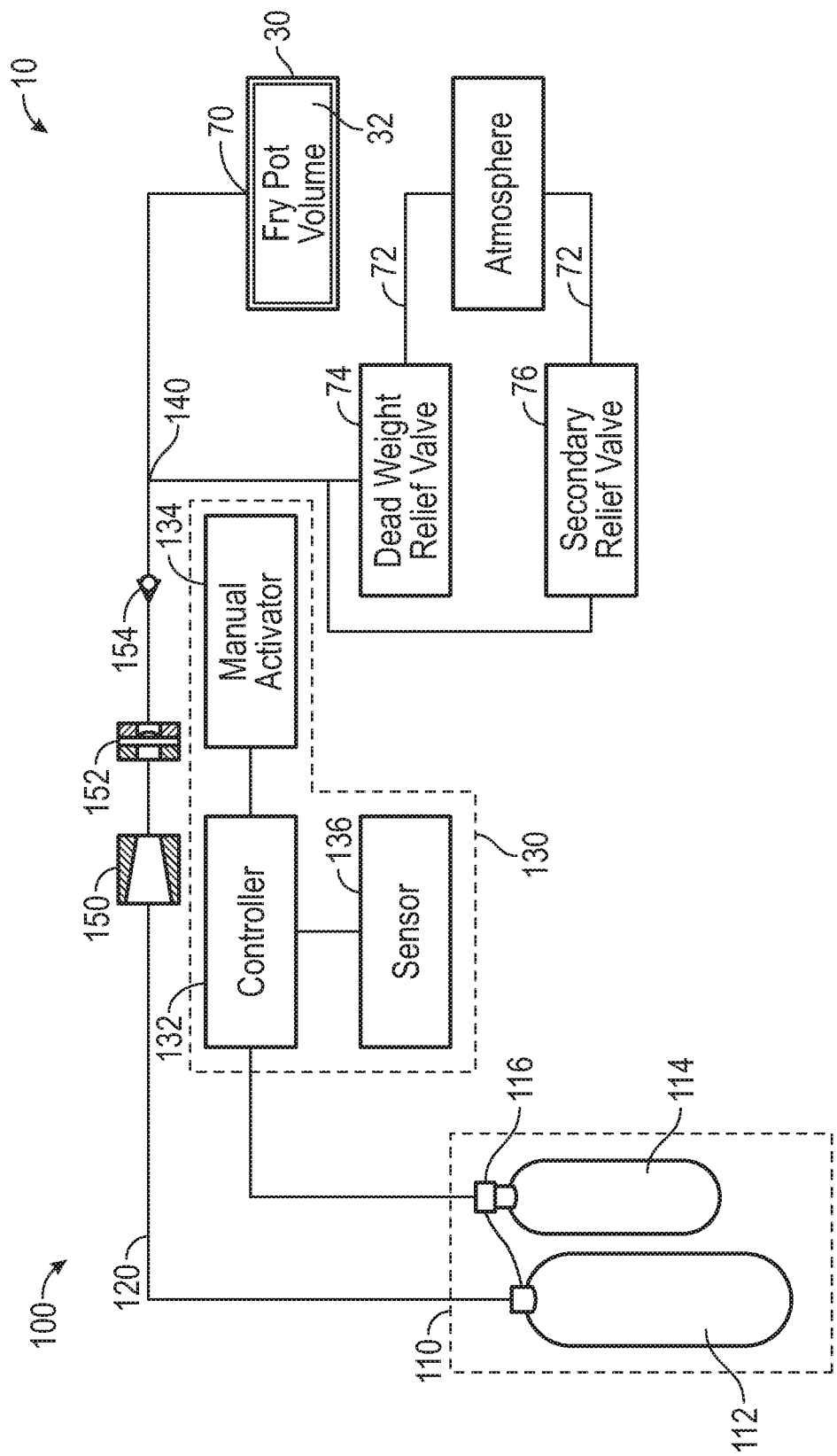
FIG. 5 is a schematic of the pressure fryer of FIG. 1 and the fire suppression system of FIG. 4.

Referring to FIGS. 2 and 5, the fry pot 30 defines an aperture, shown as vent aperture 70. The vent aperture 70 is located in a side wall (e.g., a rear side wall) of the fry pot 30. The vent aperture 70 permits gas (e.g., steam, air, etc.) from within the fry pot 30 to pass out of the fry pot volume 32 to one or more pressure control devices at least when the lid 60 is in the sealed configuration. Each of the pressure control devices are configured to selectively permit gas from within the fry pot volume 32 to exit the pressure fryer 10 to the surrounding atmosphere through an aperture or port, shown in FIG. 5 as exhaust 72. When the gas is vented to the atmosphere, the pressure within the fry pot 30 decreases. In this way, the pressure control devices control the pressure of the gas within the fry pot volume 32.

Referring to FIG. 2, to prevent cooking oil from flowing out of the fry pot volume 32 through the vent aperture 70, the vent aperture 70 may be positioned near a top end of the fry pot 30 (e.g., near the access aperture 34). Specifically, the fry pot 30 may define a fill level where the top surface of the cooking oil should be located. By way of example, the fill level may be indicated by a marking on the fry pot 30 or may be specified by the manufacturer of the pressure fryer 10 (e.g., by stating how much cooking oil should be added to the fry pot 30). The fill level may include a target fill level and a tolerance around the target fill level within which the top surface of the cooking oil may be located. The fill level may be positioned such that the top surface of the cooking oil is below the vent aperture 70 during normal operation of the pressure fryer 10.

Figure 3:
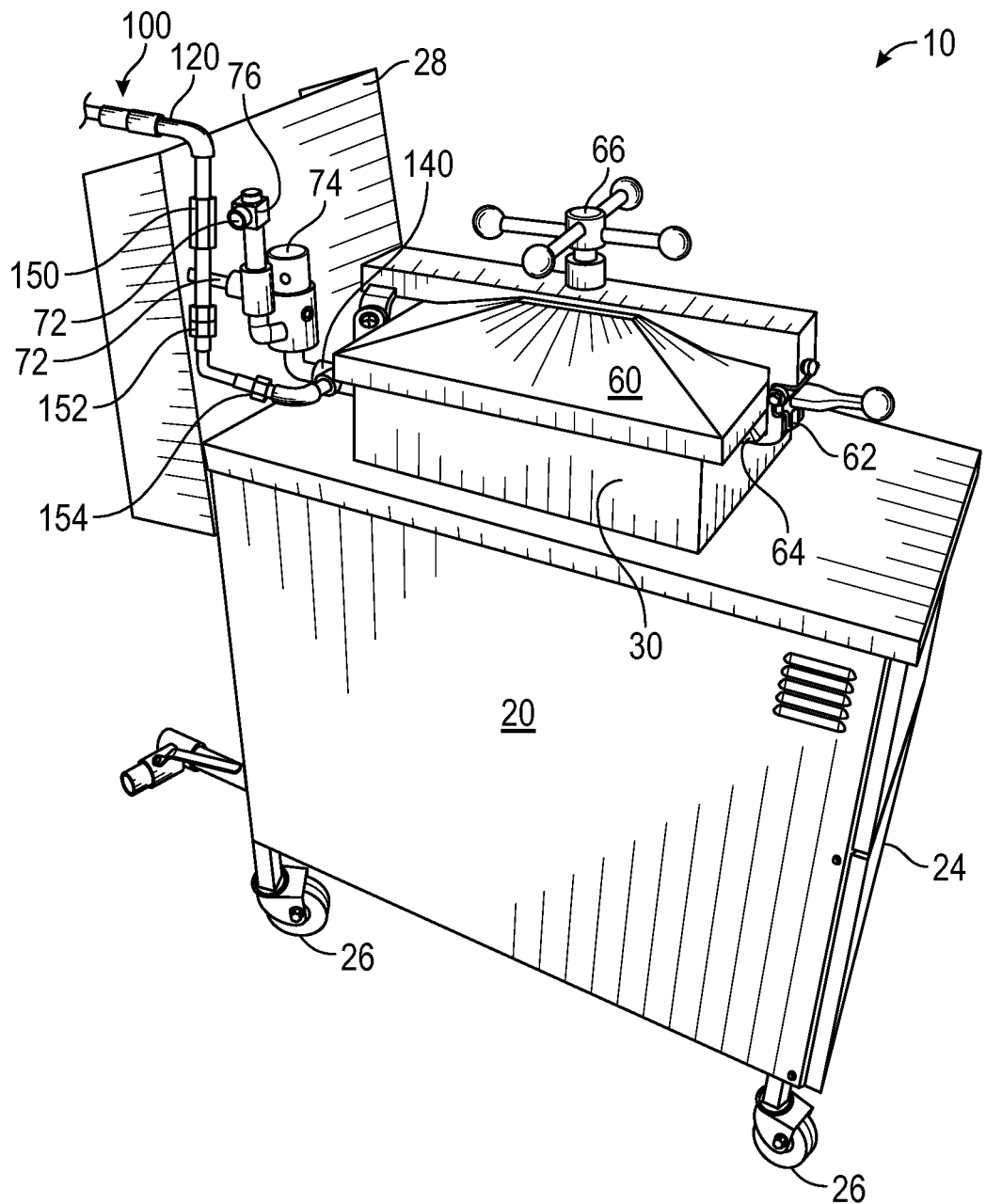
FIG. 3 is a side perspective view of the pressure fryer of FIG. 1.
Figure 4:
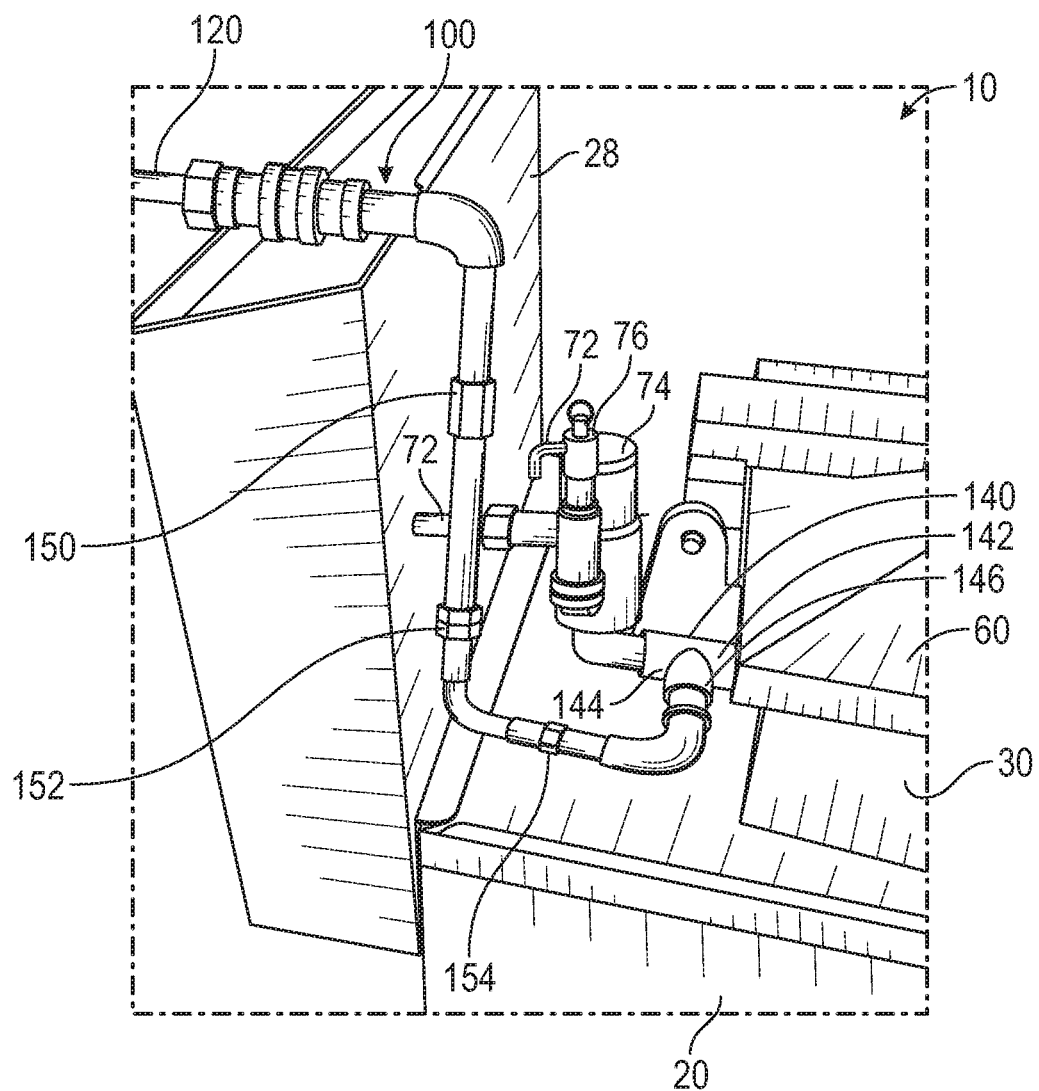
FIG. 4 is a perspective view of a fire suppression system coupled to the pressure fryer of FIG. 1.

Referring to FIGS. 3-5, the pressure fryer 10 includes a first pressure control device or pressure relief device, shown as dead weight relief valve 74. The dead weight relief valve 74 is configured to fluidly couple the fry pot volume 32 to the exhaust 72 when the pressure differential across the dead weight relief valve 74 (e.g., (the pressure within the fry pot volume 32)–(atmospheric pressure)) exceeds a first pressure differential. The dead weight relief valve 74 includes a weight that covers an aperture, preventing gas from flowing therethough. When the pressure differential exceeds the first pressure differential, the weight is pushed upward, and gas from the fry pot volume 32 is permitted to flow therethrough. As shown in FIG. 4, the exhaust 72 for the dead weight relief valve 74 extends through the backsplash 28 such that the gasses released by the dead weight relief valve 74 are diverted away from the user (e.g., to a kitchen ventilation hood, etc.).

The pressure fryer 10 further includes a second pressure control device or pressure relief device, shown secondary relief valve 76. The secondary relief valve 76 is configured to fluidly couple the fry pot volume 32 to the exhaust 72 when the pressure differential across the secondary relief valve 76 (e.g., (the pressure within the fry pot volume 32)–(atmospheric pressure)) exceeds a second pressure differential. The secondary relief valve 76 includes a spring loaded valve that is normally closed. When the pressure differential exceeds the second pressure differential, the force of the spring is overcome, and the spring loaded valve opens. In one embodiment, the second pressure differential is greater than the first pressure differential. In such an embodiment, the dead weight relief valve 74 acts as the primary pressure control device that is used during normal operation to control pressure within the fry pot volume 32.

If the dead weight relief valve 74 fails (e.g., is stuck, etc.) and the pressure builds above the first pressure differential, the secondary relief valve 76 then acts as a backup, regulating the pressure within the fry pot volume 32. In one embodiment, the second pressure differential is approximately 14.5 psi. As shown in FIG. 4, the exhaust 72 for the secondary relief valve 76 vents forward of the backsplash 28 (e.g., to provide a visual indicator to the user when the dead weight relief valve 74 is malfunctioning).

Fire Suppression System

Referring to FIGS. 3-5, the frying system includes a fire suppression system or fire extinguishing system, shown as fire suppression system 100, fluidly coupled to the fry pot 30. In the event of a fire occurring within the fry pot 30, the fire suppression system 100 is configured to provide fire suppressant agent to the fry pot volume 32, extinguishing or suppressing the fire and preventing the fire from spreading. Unlike other fire suppression systems that provide fire suppressant through the access aperture 34 (e.g., when the lid 60 is in an open position), the fire suppression system 100 is configured to suppress fires regardless of the position of the lid 60. The fire suppression system 100 can be used alone or in combination with other types of fire suppression systems (e.g., an overhead sprayer, etc.). The fire suppression system 100 may be dedicated to suppression of fires within the pressure fryer 10, or the fire suppression system 100 may be part of a larger fire suppression system within a kitchen or building.

Referring to FIG. 5, the fire suppression system 100 includes a fire suppressant agent supply, shown as supply assembly 110. The supply assembly 110 is configured to selectively provide a flow of pressurized (e.g., at greater than atmospheric pressure) fire suppressant agent. The fire suppressant agent may include water and/or other fire suppressant chemicals. The fire suppressant agent may include a dry powder, a foam, a wet chemical, or another type of fire suppressant agent. In some embodiments, the fire suppressant agent is specifically configured to suppress fires fueled by cooking oils.

In the embodiment shown in FIG. 5, the supply assembly 110 includes a fire suppressant tank 112 (e.g., a vessel, container, vat, drum, tank, canister, cartridge, can, etc.). The fire suppressant tank 112 is filled (e.g., partially, completely, etc.) with fire suppressant agent. In some embodiments, the fire suppressant agent is normally not pressurized (e.g., near atmospheric pressure).

The supply assembly 110 further includes a cartridge 114 (e.g., a vessel, container, vat, drum, tank, canister, cartridge, or can, etc.). The cartridge 114 is configured to contain a volume of pressurized expellant gas. The expellant gas may be an inert gas. In some embodiments, the expellant gas includes air, carbon dioxide, and/or nitrogen. The cartridge 114 may be rechargeable or disposable after use. In some embodiments where the cartridge 114 is rechargeable, additional expellant gas may be supplied to the internal volume of the cartridge 114 (e.g., through a neck or other fill port, etc.). Alternatively, the cartridge 114 may be omitted, and the fire suppressant tank 112 may be pressurized (e.g., as part of a stored-pressure system). In such an embodiment, the fire suppressant tank 112 may be rechargeable or disposable after use.

The supply assembly 110 further includes a valve, puncture device, or activator assembly, shown as actuator 116, that is coupled to the cartridge 114. The cartridge 114 may be selectively coupled to the actuator 116 (e.g., through a threaded connection, etc.). Decoupling the cartridge 114 from the actuator 116 facilitates removal and replacement of the cartridge 114 when the cartridge 114 is depleted. The actuator 116 is fluidly coupled to the fire suppressant tank 112 (e.g., through a hose or pipe, etc.). In embodiments where the cartridge 114 is omitted, the actuator 116 may be coupled to and/or positioned downstream of the fire suppressant tank 112 such that the actuator 116 selectively prevents the flow of agent and/or expellant gas out of the fire suppressant tank 112.

When the actuator 116 is activated, the cartridge 114 is fluidly coupled to the fire suppressant tank 112, and the expellant gas from the cartridge 114 flows freely into the fire suppressant tank 112. By way of example, the actuator 116 may include a pin that, when activated, moves to pierce a seal of the cartridge 114. The expellant gas forces fire suppressant agent from the fire suppressant tank 112 into a conduit or hose, shown as pipe 120.

Although one configuration of the supply assembly 110 is shown in FIG. 5, it should be understood that the supply assembly 110 may include any type of fire suppressant agent supply configured to selectively provide a pressurized flow of fire suppressant agent to the pipe 120. By way of example, in an alternative embodiment, the supply assembly 110 is a stored-pressure system such that one tank contains both the fire suppressant agent and the expellant gas.

To control activation of the supply assembly 110, the fire suppression system 100 further includes an activation system or control system 130 configured to selectively activate the supply assembly 110. The control system 130 is configured to monitor one or more conditions and determine if those conditions are indicative of a nearby fire. Upon detecting a nearby fire, the control system 130 activates the actuator 116, causing the fire suppressant agent to leave the fire suppressant tank 112 and suppress the fire. The control system 130 may activate the supply assembly 110 in response to the detection of a fire by a sensor and/or in response to a manual activation request (e.g., a press of a button, a pull of a lever, etc.) from a user.

As shown in FIG. 5, the control system 130 includes a controller 132 operably coupled to (e.g., in communication with) the actuator 116. The controller 132 is configured to send an activation signal (e.g., an electrical signal, a tension on a cable, etc.) to the actuator 116, causing the actuator 116 to release the expellant gas from the cartridge 114 such that the supply assembly 110 provides the agent to the pipe 120. The controller 132 is operatively coupled to one or more input devices. The input devices provide a detection signal to the controller 132 when a fire is detected. In response to receiving this indication, the controller 132 sends the activation signal to the actuator 116. The controller 132 may be dedicated to detection and suppression of fires within the fry pot 30. Alternatively, the controller 132 may be used to detect fires and/or control the suppression of fires throughout a larger area (e.g., a kitchen that contains the pressure fryer 10, a building, a building complex, etc.).

A first input device, fire detection device, or user interface, shown as manual activator 134, is configured to receive an input from a user. The manual activator 134 may include buttons, switches, levers, knobs, pull ropes, or other types of input devices. The manual activator 134 is configured to be activated by a user when a user detects a fire (e.g., within the fry pot 30, in another location within a kitchen, etc.). The manual activator 134 may be one of a series of manual activators 134 positioned throughout a room or building. When the manual activator 134 is activated, the manual activator 134 provides a detection signal to the controller 132.

A second input device, fire detection device, or sensor, shown as sensor 136, is configured to measure one or more inputs indicative of the presence of a fire. The sensor 136 may include temperature sensors (e.g., linear detection wires, thermocouples, resistance temperature detectors, etc.), infrared sensors, ultraviolet sensors, smoke detectors, or other types of sensors. Upon detection of a fire, the sensor 136 sends a detection signal to the controller 132. By way of example, the controller 132 may use a signal containing temperature measurements from a temperature sensor to determine if an ambient temperature has exceeded a threshold temperature indicative of the presence of a fire. Upon determining that the ambient temperature has exceeded the threshold temperature, the controller 132 may provide an activation signal to the actuator 116. In another embodiment, the sensor 136 is a mechanical device, such as a fusible link. When a fusible link is exposed to a threshold temperature, a temperature sensitive element of the fusible link (e.g., solder that melts at a specific temperature, etc.) releases. The fusible link may be coupled to a cable under tension such that when the temperature sensitive element releases, the tension is released. In such an embodiment, the detection signal may be a change in tension on the cable, and the controller 132 may be configured to detect the change in tension. By way of example, the change in tension may cause a spring to activate the actuator 116.

The control system 130 may be mechanical and/or electrical. In embodiments where the control system 130 operates electrically, the activation and detection signals may be electrical currents and/or signals transferring data (e.g., radio signals, Bluetooth communications, etc.). In embodiments where the control system 130 operates mechanically, the activation and detection signals may be forces or movements (e.g., tension on and/or motion of cables, etc.).

Although one configuration of the control system 130 is shown in FIG. 5, it should be understood that the control system 130 may include arrangement of control components configured to selectively activate the supply assembly 110. By way of example, the controller 132 may be omitted, and the manual activator 134 and/or the sensor 136 may communicate directly with the actuator 116.

The pipe 120 extends from the supply assembly 110 to the pressure fryer 10, terminating in a flow divider or branched fitting, shown as tee 140. The tee 140 has three legs: a leg 142 and a leg 144 that extend substantially parallel to one another, and a leg 146 that extends substantially perpendicular to the leg 142 and the leg 144. The leg 142 is fluidly coupled to the vent aperture 70, and the leg 144 is fluidly coupled to the dead weight relief valve 74 and the secondary relief valve 76. Accordingly, the tee 140 fluidly couples the dead weight relief valve 74 and the secondary relief valve 76 with the vent aperture 70. The leg 146 is fluidly coupled to the pipe 120. Accordingly, the tee 140 fluidly couples the pipe 120 with the vent aperture 70.

The fire suppression system 100 includes a series of flow control devices positioned along the length of the pipe 120. A first flow control device, flow limiter, or flow restrictor, shown as nozzle 150, is positioned along the pipe 120 downstream of the supply assembly 110. The nozzle 150 may be threaded (e.g., externally) to facilitate a direct threaded connection to the pipe 120. The nozzle 150 defines an orifice having a smaller cross-sectional area than that of the pipe 120. As the fire suppressant flows through the nozzle 150, the orifice resists or restricts the flow of the fire suppressant. The orifice of the nozzle 150 is configured to reduce the flow rate of the fire suppressant agent flowing through the nozzle 150. This reduction in flow rate reduces the kinetic energy of the agent prior to the agent entering the fry pot volume 32. This reduces the likelihood of agent splashing out of the fry pot 30, maximizing the portion of the agent that addresses the fire. This also reduces the likelihood of cooking oil splashing out of the fry pot 30, which might otherwise cause the fire within the fry pot 30 to spread. However, the flow rate defined by the nozzle 150 is still sufficient to suppress fires within the fry pot 30. In other embodiments, the nozzle 150 is replaced with another type of flow control device, such as a flow control valve. Such flow control devices may be adjustable to vary the flow rate of agent through the pipe 120.

Positioning the nozzle 150 along the pipe 120 has multiple advantages compared to an overhead nozzle that sprays into the fry pot 30 through the access aperture 34. Unlike an overhead nozzle, the nozzle 150 does not have to be aimed, simplifying the setup process of the fire suppression system 100. Additionally, if the pressure fryer 10 is relocated, the aim of the nozzle 150 does not have to be readjusted. Unlike an overhead nozzle, the nozzle 150 does not obstruct the user's access to the pressure fryer 10. Additionally, the nozzle 150 can supply agent to the fry pot 30 regardless of the position of the lid 60.

Downstream of the nozzle 150, the fire suppression system 100 includes a second flow control device, flow prevention device, or burst disc assembly, shown as burst disc 152, positioned along the pipe 120. The burst disc 152 includes a sheet of material that extends across the passage of the pipe 120, completely preventing material (e.g., solid particles, liquid, gas, etc.) from flowing along the pipe 120. When a threshold pressure differential across the burst disc 152 is exceeded, the sheet of material within the burst disc 152 ruptures, permitting free flow of material along the pipe 120 through the burst disc 152. During normal operation of the pressure fryer 10, the burst disc 152 prevents contaminants from the fry pot volume 32 (e.g., food particles, steam, cooking oil, etc.) from travelling through the pipe 120 to the supply assembly 110. The burst disc 152 also prevents the fire suppression system 100 from introducing contaminants (e.g., fire suppressant agent, dust, etc.) into the fry pot 30. When the supply assembly 110 is activated, the pressure of the fire suppressant agent from the supply assembly 110 causes the pressure differential across the burst disc 152 to exceed the threshold pressure differential, rupturing the burst disc 152. After rupturing, the burst disc 152 permits the agent to flow freely along the pipe 120 to the fry pot volume 32.

Downstream of the burst disc 152, the fire suppression system 100 includes a third flow control device, pressure control device, or flow restrictor, shown as check valve 154, positioned along the pipe 120. The check valve 154 may be any type of check valve (e.g., a ball type check valve, a plug type check valve, etc.). The check valve 154 is configured to prevent material from flowing through the pipe 120 in an upstream direction (i.e., from the fry pot volume 32 toward the supply assembly 110) and to permit material to flow through the pipe 120 in a downstream direction opposite the upstream direction. The check valve 154 prevents pressurized gas (e.g., steam, etc.) from the fry pot volume 32 from reaching the burst disc 152. The check valve 154 permits (e.g., with minimal resistance) the agent from the supply assembly 110 to pass through the pipe 120 to the fry pot volume 32.

During normal operation of the pressure fryer 10, the pressure of gasses sealed within the fry pot volume 32 by the lid 60 increases from atmospheric pressure to a working pressure that is maintained by the dead weight relief valve 74 and/or the secondary relief valve 76. These gasses are in direct communication with the check valve 154. The check valve 154 prevents the majority of these gasses from moving along the pipe 120 toward the supply assembly 110. However, some types of check valves do not provide a perfect seal, and some leakage of material through the check valve 154 may occur. Any leakage through the check valve 154 is prevented from reaching the supply assembly 110 by the seal of the burst disc 152. This leakage is not substantial enough to significantly affect the pressure differential across the burst disc 152 during normal operation of the pressure fryer 10, so the check valve 154 prevents high pressures within the fry pot volume 32 from reaching the burst disc 152. Without the check valve 154, gasses from the fry pot volume 32 would otherwise be in direct communication with the burst disc 152. The pressure and temperature fluctuations of these gasses may then have the potential to weaken or prematurely rupture the burst disc 152.

When the supply assembly 110 is activated, the fire suppressant agent enters the pipe 120 and passes through the nozzle 150. The nozzle 150 reduces the flow rate and/or pressure of the agent downstream of the nozzle 150. The nozzle 150 may be configured to achieve a target pressure and/or flow rate of the agent downstream of the nozzle 150. The nozzle 150 may be configured to shape the stream of agent leaving the nozzle 150. By way of example, the orifice of the nozzle 150 may have a specific geometry that varies the shape and/or size (e.g., a diameter at a distance from the nozzle 150, etc.) of the stream.

Downstream of the nozzle 150, the agent engages the burst disc 152. The pressure upstream of the burst disc 152 is the pressure of the agent downstream of the nozzle 150, and the pressure downstream of the burst disc 152 is the pressure of the gas contained between the burst disc 152 and the check valve 154. The burst disc 152 is configured to remain intact (i.e., not rupture) when the supply assembly 110 is inactive and to rupture when the supply assembly 110 is activated. Accordingly, the threshold pressure differential at which the burst disc 152 ruptures may be greater than the difference between the upstream and downstream pressures when the supply assembly 110 is inactive and less than the difference between the downstream and upstream pressures when the supply assembly 110 is active. When the supply assembly 110 is inactive, the upstream pressure may be approximately atmospheric pressure. When the supply assembly 110 is active, the upstream pressure may be greater than atmospheric pressure. When the supply assembly 110 is active, the upstream pressure may be influenced by the characteristics of the supply assembly 110 and the pipe 120 (e.g., the pressure of the gas within the cartridge 114, the volume of the pipe 120 upstream of the burst disc 152, etc.) and the nozzle 150 (e.g., the orifice diameter, etc.). In one embodiment, the downstream pressure is approximately atmospheric pressure. When the pressure fryer 10 is not in use, gas (e.g., air, etc.) may pass out of the space between the check valve 154 and the burst disc 152 until that space is at approximately atmospheric pressure. When the pressure within the fry pot 30 builds above atmospheric pressure, the check valve 154 may prevent gas from flowing into the space between the check valve 154 and the burst disc 152.

After the agent causes the burst disc 152 to rupture, the agent engages the check valve 154. The check valve 154 permits the agent to pass freely therethrough, and the agent passes through the tee 140, through the vent aperture 70, and into the fry pot volume 32. Because the vent aperture 70 is positioned above the top surface of the cooking oil within the fry pot 30, the fire suppression system 100 introduces the agent above the top surface of the cooking oil. When the lid 60 is in the fully open position or the unsealed configuration, the agent may completely or partially fill the fry pot volume 32. If the fry pot volume 32 is completely filled, the agent may spill out through the access aperture 34. When the lid 60 is in the sealed configuration, the agent may remain contained within the fry pot volume 32, partially or completely filling the fry pot volume 32. In other embodiments, the fire suppression system 100 does not supply agent to the fry pot volume 32 when the lid 60 is in the sealed configuration, instead using the seal 68 to prevent oxygen from entering the fry pot volume 32 and suppress any fires within the fry pot volume 32. The agent may additionally pass through the tee 140 toward the dead weight relief valve 74 and the secondary relief valve 76. However, the dead weight relief valve 74 and the secondary relief valve 76 may offer a greater resistance to flow of the agent than simply passing through the vent aperture 70. Accordingly, a minimal amount of agent or no agent may pass out of the fire suppression system 100 through the dead weight relief valve 74 and the secondary relief valve 76.

In other embodiments, the nozzle 150, the burst disc 152, and/or the check valve 154 are located in positions other than those shown in FIGS. 3-5. The nozzle 150, the burst disc 152, and the check valve 154 may be positioned anywhere between the supply assembly 110 and the fry pot volume 32. By way of example, the nozzle 150 may be moved between the tee 140 and the vent aperture 70. By way of another example, in FIG. 3, the pipe 120 is shown to bend approximately 90 degrees between the burst disc 152 and the check valve 154. The burst disc 152 may be positioned downstream of the bend or the check valve 154 may be positioned upstream of the bend. Alternatively, the pipe 120 may be otherwise shaped (e.g., completely straight, bends in other places, etc.). In some embodiments, the relative order of the nozzle 150, the burst disc 152, and/or the check valve 154 is varied. By way of example, the nozzle 150 may be positioned between the burst disc 152 and the check valve 154 or downstream of the check valve 154.

In other embodiments, the nozzle 150, the burst disc 152, and/or the check valve 154 are omitted. By way of example, the nozzle 150 may be omitted. By way of another example, the burst disc 152 may be omitted. In such an embodiment, the check valve 154 may prevent or resist contaminants from passing from the fry pot volume 32 to the supply assembly 110. By way of another example, the check valve 154 may be omitted. In such an embodiment, the burst disc 152 may prevent contaminants from traveling through the pipe 120. By way of another example, all of the nozzle 150, the burst disc 152, and the check valve 154 may be omitted. In such an embodiment, the fire suppression system 100 still provides the benefit of suppressing fires within the fry pot volume 32 with the lid 60 in the closed position, but without the performance benefits provided by the nozzle 150, the burst disc 152, and the check valve 154.

Although the fire suppression system 100 is shown and described herein configured for use with the pressure fryer 10, the fire suppression system 100 may be configured for use with other types of appliances having food receptacles in which food products are cooked. By way of example, the fire suppression system 100 may be used with non-pressure fryers (i.e., fryers that operate at atmospheric pressure). In some embodiments, the appliance includes a cover (e.g., a door, a lid, etc.) that selectively blocks access to the internal volume of the food receptacle. By way of example, the fire suppression system 100 may be configured for use with ovens or toasters. By way of yet another example, the fire suppression system 100 may be configured for use with pressure cookers. By way of yet another example, the fire suppression system 100 may be configured for use with a tilt skillet or a braising pan.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the cooking system as shown in the various exemplary embodiments is illustrative only. Additionally, any element disclosed in one embodiment may be incorporated or utilized with any other embodiment disclosed herein. For example, the positioning of the nozzle 150 downstream of the check valve 154 in one exemplary embodiment may be utilized with the pressure fryer 10 that includes the slidably coupled lid 60 of another exemplary embodiment. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A cooking system, comprising:
   an appliance configured to cook food products, the appliance comprising:
      a food receptacle defining:
         an internal volume configured to contain the food products during cooking;
         a fluid aperture fluidly coupled to the internal volume; and
         an access aperture through which the food products may be introduced into the internal volume; and
      a cover selectively repositionable between an open position and a closed position, wherein the cover extends at least partway across the access aperture in the closed position;
   a fire suppressant supply configured to selectively provide fire suppressant agent;
   a conduit fluidly coupling the fire suppressant supply to the fluid aperture; and
   a burst disc positioned along the conduit and configured to rupture to fluidly couple the fire suppressant supply to the fluid aperture;
   wherein the fire suppressant supply and the conduit are configured to introduce the fire suppressant agent into the internal volume of the food receptacle at least when the cover is in the closed position.

2. The cooking system of claim 1, further comprising a flow restrictor positioned along the conduit and configured to restrict a flow rate of the fire suppressant agent into the internal volume of the food receptacle.

3. The cooking system of claim 2, wherein the burst disc is configured to rupture in response to the fire suppressant supply providing the fire suppressant agent.

4. The cooking system of claim 3, further comprising a check valve positioned along the conduit and configured to resist movement of material from the internal volume of the food receptacle to the fire suppressant supply through the conduit.

5. The cooking system of claim 4, wherein the burst disc is positioned downstream of the flow restrictor, and wherein the check valve is positioned downstream of the burst disc.

6. The cooking system of claim 1, wherein the burst disc is configured to fluidly decouple the fire suppressant supply from the internal volume of the food receptacle when a pressure differential across the burst disc is less than a threshold pressure differential, and wherein the burst disc is configured to rupture in response to the pressure differential across the burst disc exceeding the threshold pressure differential.

7. The cooking system of claim 1, wherein the cover is selectively reconfigurable into a sealed configuration while in the closed position, and wherein the cover and the food receptacle are configured to cooperate to seal the cover to the food receptacle when the cover is in the sealed configuration.

8. The cooking system of claim 7, wherein the appliance is a pressure fryer, wherein the food receptacle is a fry pot configured to contain cooking oil that is heated to cook the food products, wherein the pressure fryer further comprises a pressure relief valve fluidly coupled to the fluid aperture, wherein the pressure relief valve is configured to permit material to pass from the internal volume through the fluid aperture and the pressure relief valve when a pressure differential across the pressure relief valve exceeds a first threshold pressure differential.

9. The cooking system of claim 1, wherein the appliance is a fryer, wherein the food receptacle is a fry pot configured to contain cooking oil that is heated to cook the food products, and wherein the fluid aperture is positioned such that the fire suppressant supply and the conduit are configured to introduce the fire suppressant agent into the internal volume of the fry pot above a top surface of the cooking oil.

10. A cooking system, comprising:
    an appliance defining an internal volume and a fluid aperture fluidly coupled to the internal volume;
    a fire suppressant supply configured to selectively provide fire suppressant agent;
    a control system configured to activate the fire suppressant supply to provide the fire suppressant agent in response to an indication that a fire has been detected;
    a conduit fluidly coupling the fire suppressant supply to the fluid aperture; and
    a burst disc positioned along the conduit and configured to rupture when a pressure differential across the burst disc is greater than a threshold pressure differential, thereby fluidly coupling the fire suppressant supply to the internal volume of the appliance;
    wherein the fire suppressant supply and the conduit are configured to introduce the fire suppressant agent into the internal volume of the appliance through the fluid aperture.

11. The cooking system of claim 10, further comprising a flow restrictor positioned along the conduit and configured to restrict a flow rate of the fire suppressant agent into the internal volume of the appliance.

12. The cooking system of claim 11, further comprising a check valve configured to resist movement of material from the internal volume of the appliance to the fire suppressant supply through the conduit.

13. The cooking system of claim 12, wherein the burst disc is positioned downstream of the flow restrictor, and wherein the check valve is positioned downstream of the burst disc.

14. A cooking system, comprising:
    a pressure fryer comprising:
       a fry pot defining:
          an internal volume configured to contain cooking oil that is heated to cook food products;
          a fluid aperture fluidly coupled to the internal volume; and an access aperture through which the food products may be introduced into the internal volume;

a pressure relief valve fluidly coupled to the fluid aperture; and a cover selectively repositionable between an open position and a closed position, wherein the cover extends at least partway across the access aperture in the closed position;

a fire suppressant supply configured to selectively provide fire suppressant agent; and a conduit fluidly coupling the fire suppressant supply to the fluid aperture;

wherein the fire suppressant supply and the conduit are configured to introduce the fire suppressant agent into the internal volume of the fry pot at least when the cover is in the closed position, and wherein the pressure relief valve is configured to permit material to pass from the internal volume through the fluid aperture and the pressure relief valve when a pressure differential across the pressure relief valve exceeds a first threshold pressure differential.

15. The cooking system of claim 14, wherein the cover is selectively reconfigurable into a sealed configuration while in the closed position, and wherein the cover and the fry pot are configured to cooperate to seal the cover to the fry pot when the cover is in the sealed configuration.

\* \* \* \* \*